Oct. 27, 1959    W. BEUKEMA ET AL    2,909,830
METHOD OF MANUFACTURE OF TUBULAR CONDENSERS
Filed Dec. 2, 1953
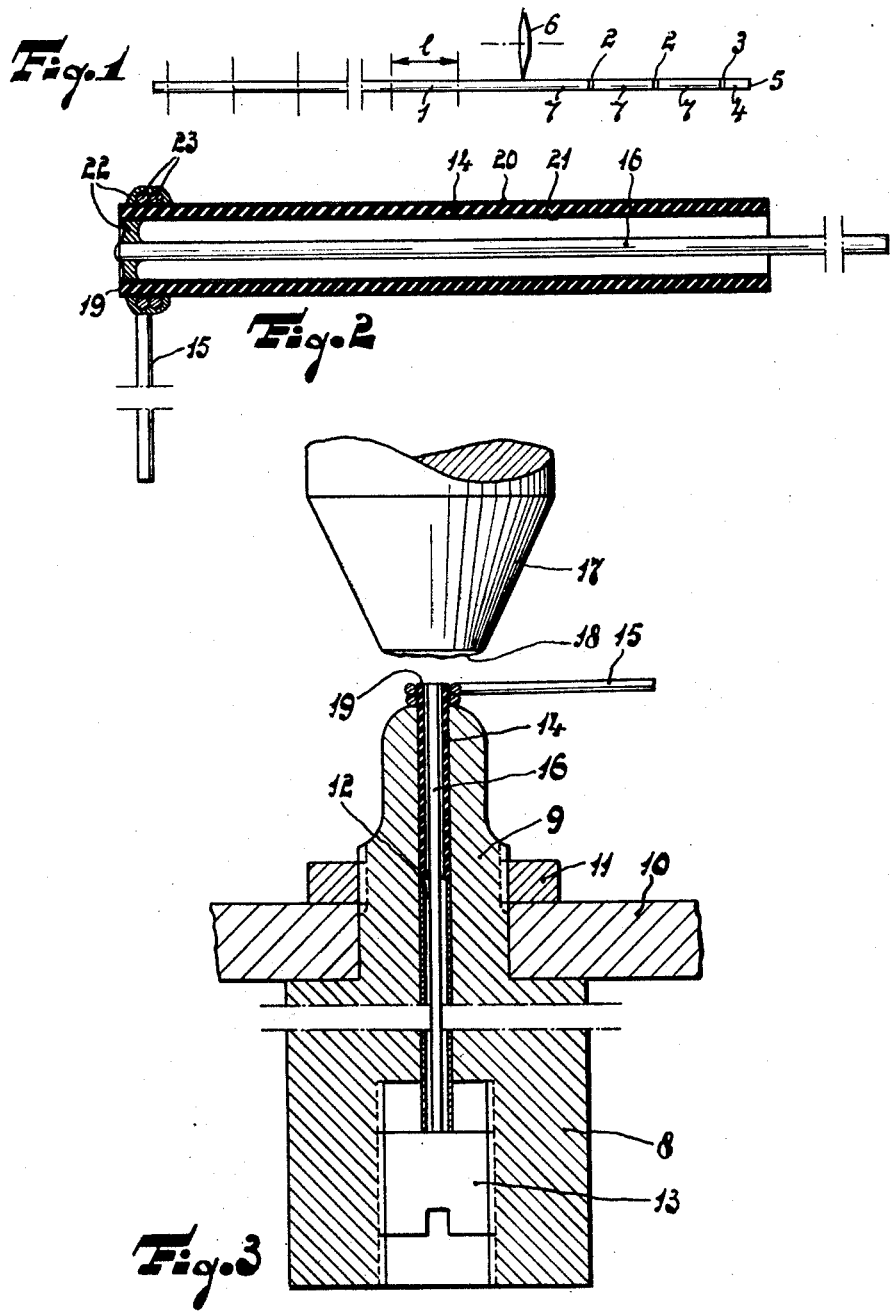
INVENTORS
WILLEM BEUKEMA
JOHANNES VUURMANS
BY Fred M Vogel
AGENT

2,909,830
METHOD OF MANUFACTURE OF TUBULAR CONDENSERS

Willem Beukema and Johannes Vuurmans, Eindhoven, Netherlands, assignors, by mesne assignments, to North American Philips Company, Inc., New York, N.Y., a corporation of Delaware Application December 2, 1953, Serial No. 395,702

Claims priority, application Netherlands December 9, 1952

3 Claims. (Cl. 29—25.42)

Our invention relates to a method of manufacturing miniature condensers or capacitors having a dielectric in the form of a ceramic tube.

Among the various types of condensers or capacitors used in radio engineering there are types which must have very small dimensions. Such small condensers, which must also have relatively high capacities, cannot be manufactured readily and it is difficult to avoid serious deviations from the correct size. In this field drawn condensers are successfully used, because they occupy an extremely small space, no greater space than is occupied by a connecting wire, and they are therefore frequently used in bandpass filters for the intermediate frequencies. However, their manufacture requires extensive machinery, so that they can be made economically only in large series.

The invention relates to a capacitor occupying only a slightly larger space than a drawn capacitor of the same capacity and permitting a manufacture at low cost.

The capacitor according to the invention is one of the kind in which the di-electric is constituted by a small tube or tubule of ceramic material. The manufacture of such capacitors, particularly of capacitors of very low capacity, gives rise to the problems of applying coatings of the correct surfaces to the walls of the tubule and of securing the connecting wire or lead for the inner coating. For these problems various solutions have been suggested, but none of them is so simple and so suitable for the manufacture of miniature capacitors as that to be described hereinafter.

The cylindrical surfaces of the tubule constituting the di-electric of the capacitor according to the invention are completely metal-coated with the exception of the head or end surfaces. The tubule surrounds a lead wire, which projects therefrom only at one end. At the other end of the tubule the wire is secured to the inner coating by soldering. At this end the other wire is soldered to the outer coating.

The two connecting wires may be secured simultaneously with the aid of such a small quantity of solder that it does not bridge the head surface after having solidified.

In accordance with the invention, in order to secure the connecting wires rapidly by means of machines, the tubule is introduced into a bored holder comprising a stop. This stop determines the depth to which the tubule extends into the holder. It is arranged in a manner such that a sufficient length of the tubule projects from the holder to permit winding a lead wire about the tubule. After the outer wire has been wound about the projecting portion, a straight connecting wire is passed through the tubule to such an extent that it projects from the holder over the same length as the tubule.

The inner wire may be passed downwardly through the tubule to the bottom of the stop. For this purpose the stop must be shaped in a form such that the wire extends further into the holder than the tubule a distance equal to the distance it is to project from the tubule. In this case the wire may be cut to measure previously, but as an alternative it may be cut along the outer edge of the tubule after its introduction into the tubule. Then, with the aid of a soldering iron the two wires and the ends of the coatings of the tubule are brought simultaneously into contact with liquid solder.

As an alternative, the inner wire may be introduced into the holder from below, slipped on till its end reaches the head surface of the tubule projecting from the holder and cut off as soon as the holder has soldified. In this case the stop is used only for the tubule.

For the manufacture of the tubules proper the starting material may be a tube of ceramic material with inner and outer coatings of metal, for example, silver, its diameter and wall thickness being that of the capacitor to be manufactured, its length being, however, several times longer. By means of shallow grooves this tube is divided into pieces of the desired length and broken at each of these grooves. The pieces having the required length of the capacitor exhibit no metal coating at their end surfaces, so that the inner coating and the outer coating are insulated from one another. The minimum wall thickness of the tube is determined by the required leaking path or the mechanical strength. The diameter is chosen to be such that the capacitor has a suitable length at the desired capacity.

In order that the invention may be readily carried into effect, it will now be described with reference to the accompanying drawing, in which Figure 1 is a side view of a coated ceramic tube during the process of the invention, Fig. 2 is a sectional view on an enlarged scale of a condenser made by the method of the invention, and Fig. 3 is a sectional view of a holder used for soldering the lead wires during the method of the invention.

For the manufacture of capacitors according to the invention the starting material may be ceramic tubes of, for example, 180 mms. in length, 1.3 mms. in diameter, and 0.2 mm. in wall thickness. A suspension of a metal compound is passed through these tubes in known manner whereby the compound is deposited on the inner surfaces and the metal, for example silver, is then set free by heating. The tubes are immersed into the same suspension in order to provide a metal layer also on the outer surface. When applying these layers it is difficult to prevent the head surfaces from being also coated with metal.

As shown in Figure 1, a tube 1 which has been provided on its inner and outer surface with a silver layer in the manner described above is then provided with shallow grooves 2 at intervals equal to the length $l$ of the capacitors to be manufactured. These grooves form areas where the tube cracks, as soon as it is subjected to slight bending forces, so that it can readily be broken into pieces of equal lengths. The first groove 3 may be provided at a shorter distance from the tube end, since the first piece 4 cannot be used owing to the metal coating on the end surface 5. The grooves may be made by urging the tube, rotating or not rotating about its axis, with a slight force against a rapidly-rotating cutting tool 6, such as a knife, milling cutter or grinding wheel.

The grooves may be provided one by one, in which case the cutting tool or the tube must be displaced each time a distance $l$. Alternatively a plurality of cutting tools may be arranged for cutting all grooves or a few grooves simultaneously.

The pieces 7 into which the tube is divided are free from metal at the break surfaces which form the end surfaces of the condensers. In accordance with the invention, this fact is utilized to enable the leads to be simultaneously soldered to the coatings at the same end of condenser.

In order to simultaneously solder the leads to the coatings, a capacitor body 14, similar to body 7 of Figure 1, is introduced into a holder shown on an enlarged scale in Figure 3. This holder comprises a member 8 having a top portion 9 of smaller diameter than the lower portion and provided with external threads which are engaged by a nut 11 to secure the holder to a table 10. The capacitor body 14 fits snugly into a bore provided in portion 9 which bore connects with a larger-sized internally-threaded bore at the bottom of member 8. The lower end of body 14 rests upon the upper end of a tube 12 and the upper end projects beyond the spherical-shaped upper surface of portion 9 a distance which may be adjusted by an adjusting nut 13 in the lower cavity of member 8.

A connecting wire 15 is wound about with one or two turns around the projection of capacity body 14 and then cut to the desired length in known manner by means of a machine. Then a second connecting wire 16 is introduced through the capacitor body 14 into the tube 12. This wire has been previously cut to measure or is cut to measure afterwards in a manner such that when it bears upon the adjusting nut 13, it projects as far from the holder as the capacitor body, i.e. its upper end is flush with the end surface of the body 14. As tube 12 is wider than the body 14, the wire 16 always slips easily downwards and cannot hook at the edge of tube 12 and be curved during the introduction. If the wire is introduced into the holder from below, for which purpose the adjusting screw 13 must be provided with a central aperture, the diameter of the tube must be slightly smaller than that of the body 14, in order to prevent the wire from catching on the lower edge of the body.

After the two connecting wires have been positioned a heated soldering iron 17, provided with a small quantity of soldering tin 18, is pressed against the end of the capacitor body. The turn or turns of the wire 15 are then coated with soldering tin, which also adheres to the metal coating on the outer side of the capacitor body 14. The soldering tin also penetrates into the body 14 and adheres over a small distance to the metal coating on the inner surface and to the end of the connecting wire 16. After the soldering iron has been removed and the soldering tin remaining on the body 14 has cooled, a strong conductive connection of the connecting wires to the capacitor coatings has been obtained. The end surface 19 which is not metal-plated and is thus not wetted by the liquid soldering tin, remains uncoated. The two coatings thus remain completely insulated from one another, even subsequent to soldering. The capacitor is then completed and may be lifted from the holder with the aid of the wire 15.

In the manner described above miniature capacitor can be manufactured in large series with low tolerances. A capacitor thus manufactured has a dielectric comprising, for example, mainly zirconium titanate and is provided with coatings of silver. Such a capacitor having a length of 13 mms., a diameter of 1.3 mms., and a wall thickness of 0.2 mm. may have a capacity of about 100 micro-farads. Such a capacitor is shown on a scale of approximately 10:1 in Figure 2 in which same reference numerals indicate the same parts as in Figure 3. In addition the inner and outer silver coatings are indicated by reference numerals 21 and 22 respectively, whereas reference numeral 22 designates the solidified solder which connects the turns 23 of lead wire 15 to coating 20 and connects the end of lead wire 16 to coating 2.

The space occupied by a capacitor according to the invention is approximately equal to that occupied by a drawn capacitor of the same capacity, so that in component parts, for example, bandpass filters, the drawn capacitors may be replaced by ceramic capacitors according to the invention without further modification.

What is claimed is:

1. A method of making tubular condensers comprising the steps of coating the inner and outer surfaces of a ceramic tube with continuous layers of metallic material to thereby form electrodes, grooving the outer surface of the coated tube at points spaced apart at distances equal to the lengths of the condensers, cracking the coated tube at said grooves to form condensers having electrode coatings over the entire inner and outer surfaces, and soldering leads to ends of the inner and outer metallic layers at the same end of each of the condensers.

2. A method of making tubular miniature condensers comprising the steps of coating the inner and outer surfaces of a long thin-walled ceramic tube with continuous layers of metallic material to thereby form electrodes, grooving the outer surface of the coated tube at points spaced apart distances equal to the lengths of the condensers to be formed, cracking the coated tube at said grooves to form condensers having electrode coatings extending only over the inner and outer surfaces thereof, soldering one lead to the outer coating of one of said condensers and adjacent one end thereof, passing a second lead through said condenser, and soldering one end of said second lead to the inner coating adjacent the end near which said first lead is soldered.

3. A method of making tubular condensers comprising the steps of coating the inner and outer surfaces of a ceramic tube with continuous layers of metallic material to thereby form electrodes, grooving the outer surface of the coated tube at points spaced apart at distances equal to the lengths of the condensers, cracking the coated tube at said grooves to form condensers having electrode coatings over the entire inner and outer surfaces, placing one end of a lead in contact with the outer metallic layer near one end of one of said condensers, passing a second lead through the tube with one end in contact with the inner metallic layer near the same end of said condenser, and applying solder to said end of the condenser to simultaneously solder each of said leads to the respective layer.

References Cited in the file of this patent

UNITED STATES PATENTS

| | | |
|---|---|---|
| 2,257,643 | Pasche | Sept. 30, 1941 |
| 2,398,088 | Ehlers | Apr. 9, 1946 |
| 2,491,688 | Pickels | Dec. 20, 1949 |
| 2,492,742 | Grasheim | Dec. 27, 1949 |
| 2,496,095 | Kallmann | Jan. 31, 1950 |
| 2,585,752 | Dorst | Feb. 12, 1952 |
| 2,614,149 | Steyer et al. | Oct. 14, 1952 |
| 2,673,972 | Minnium | Mar. 30, 1954 |

FOREIGN PATENTS

| | | |
|---|---|---|
| 500,178 | Belgium | June 21, 1951 |